R. M. GARNER.
COTTON CHOPPER.
APPLICATION FILED AUG. 19, 1909.
953,264.
Patented Mar. 29, 1910.
2 SHEETS—SHEET 2.
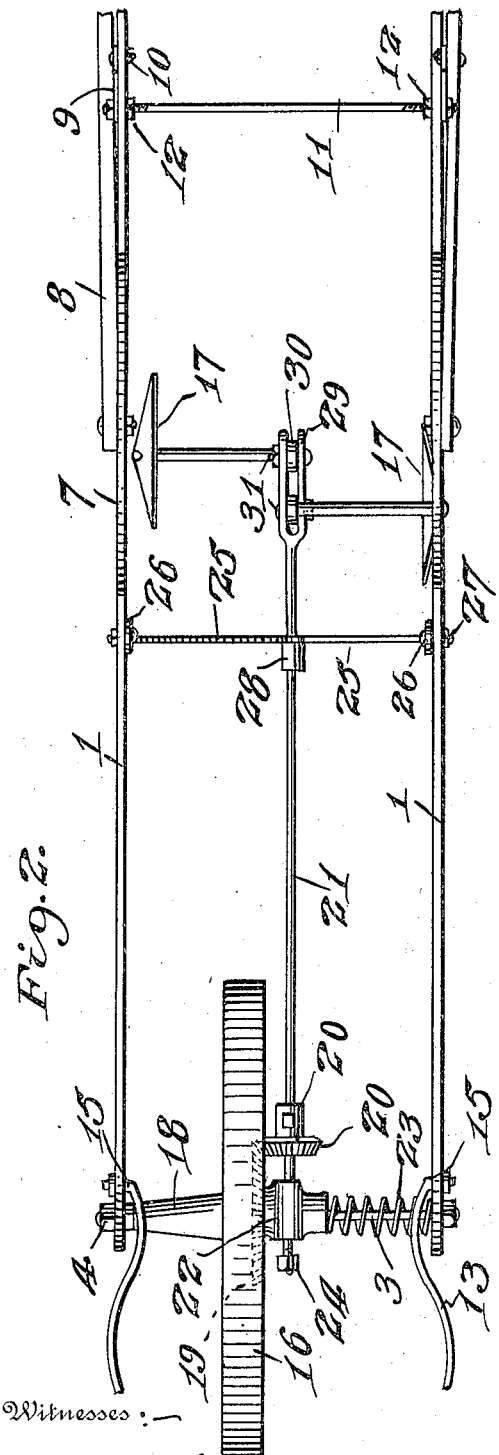
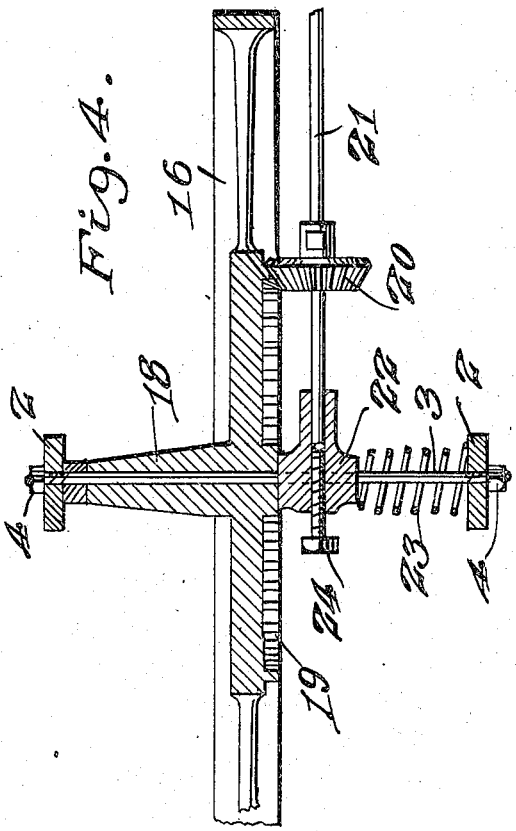

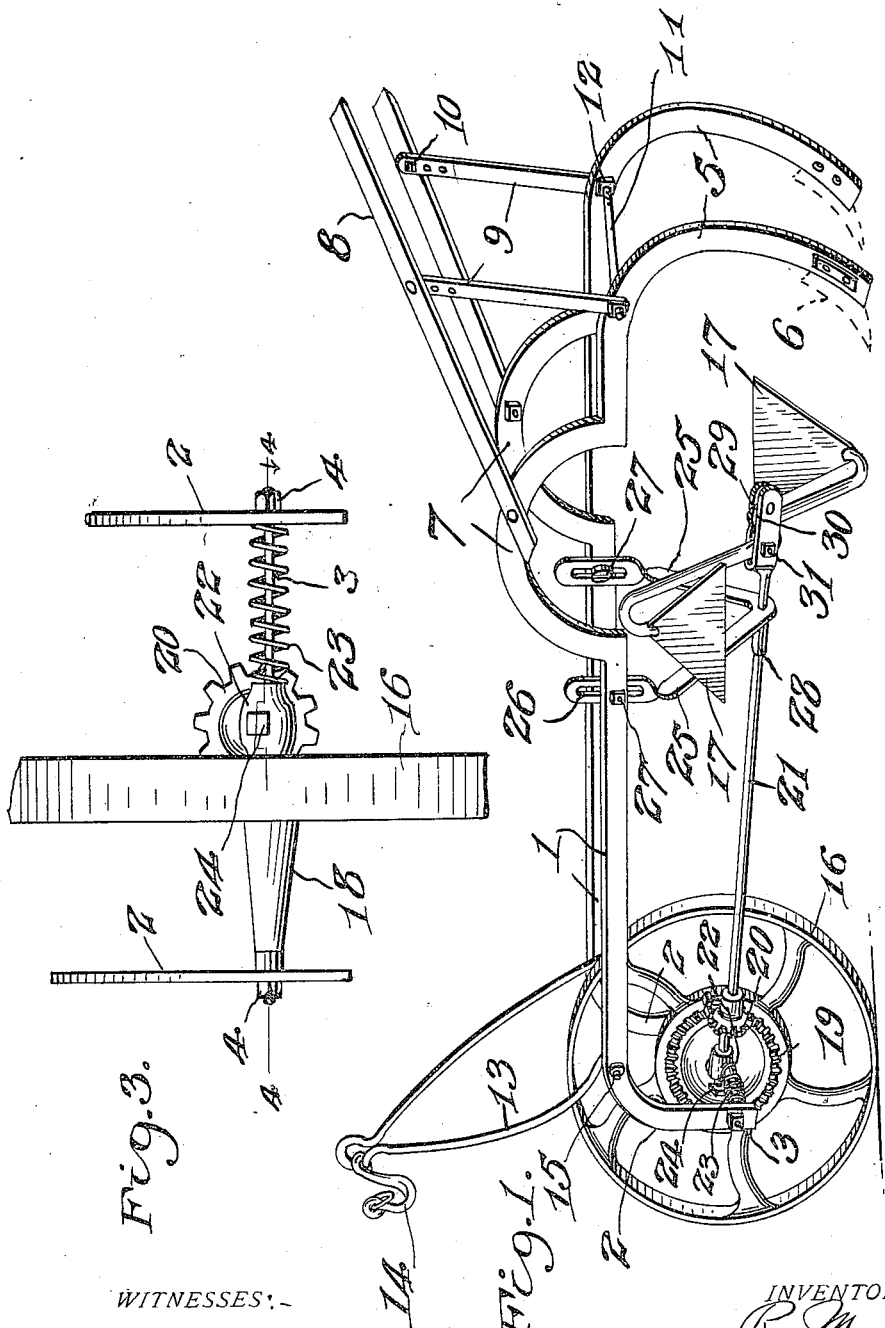

UNITED STATES PATENT OFFICE

ROBERT M. GARNER, OF RIPLEY, ALABAMA.

COTTON-CHOPPER.

953,264.   Specification of Letters Patent.   Patented Mar. 29, 1910.

Application filed August 19, 1909. Serial No. 513,632.

*To all whom it may concern:*

Be it known that I, ROBERT M. GARNER, a citizen of the United States, residing at Ripley, in the county of Limestone and State of Alabama, have invented certain new and useful Improvements in Cotton-Choppers, of which the following is a specification, reference being had to the accompanying drawings.

This invention relates to improvements in cotton choppers and its object is to provide a simple and practical machine of this character which will be light and yet strong and durable in construction, and at the same time comparatively inexpensive.

With the above and other objects in view, the invention consists of the novel construction, combination and arrangement of parts, hereinafter fully described and claimed, and illustrated in the accompanying drawings in which—

Figure 1 is a perspective view of the improved cotton chopper. Fig. 2 is a top plan view. Fig. 3 is a detail front end view, and Fig. 4 is a detail horizontal section taken on the plane indicated by the lines 4—4 in Fig. 3.

The frame of the improved cotton chopper comprises two metal side bars 1 having their forward ends downturned to provide hangers 2 for a transverse shaft 3. The latter passes through openings in the hangers 2 and has its threaded ends provided with nuts 4 whereby the side bars of the frame are united. The rear ends of the bars 1 are also bent downward but to a greater extent, and these downwardly and forwardly curved rear ends 5 form standards to which cultivator shafts, indicated in dotted lines at 6, or other earth working elements may be fastened. The intermediate portions of the bars or beams 1 have upwardly offset portions 7 of substantially semicircular shape, to which portions are secured the lower front ends of the connected handle bars 8. The latter are supported by upright braces 9, the upper ends of which are adjustably connected as at 10 to the handles, and the lower ends of which are secured to the rear portions of the bars 1 by a transverse connecting rod 11, which latter serves to space apart and adjustably unite said bars 1. To permit of this adjustment of the width of the frame, said rod or bar 11 has screw threaded ends which pass through openings in the bars 1 and braces 9, and has clamping nuts 12 on opposite sides of said parts.

13 denotes a substantially U-shaped draft bail having at its forward end an eye to receive a swingletree engaging hook 14, and the rear ends of said bail are outturned and pivotally secured as at 15 in the forward portions of the side bars 1.

The front end of the frame is supported by a ground wheel 16 which serves to drive the chopping hoes 17. The wheel 16 has on one side of its hub an extended portion 18 through which the shaft 3 extends and which serves to maintain said wheel centrally in the frame. Upon the other side of said wheel is formed or provided a gear 19, with which meshes a pinion 20 adjustably secured to a longitudinal shaft 21. The forward end of this shaft is rotatable in a bearing member 22 arranged on the shaft 3 for movement toward and from the gear 19 and pressed normally against the latter by a coil spring 23 surrounding said shaft. This construction it will be seen holds the pinion 20 in yieldable engagement with the gear so that should the hoes 17 meet with any obstruction the pinion may slip out of mesh with the gear and the latter will turn independently, thus obviating breakage.

24 denotes a set screw arranged in the bearing or knuckle 22 and engaged with the forward end of the shaft 21 whereby the latter may be adjusted longitudinally. The rear portion of the shaft 21 is adjustably supported by means of a V-shaped hanger 25 constructed from a metal bar or strap and having the upper portions of its arms disposed vertically and formed with slots 26 for the reception of clamping bolts 27 whereby said arms may be secured in adjusted position on the inner faces of the side bars 1. Projecting forwardly from the pointed lower end of the hanger 25 is a bearing cuff 28 to give a substantial bearing to the shaft 21. The rear end of the shaft 21 has an enlarged flattened portion 29 which is bifurcated for the reception of the flattened inner ends of the shanks 30 of the hoe blades 17. These blades are preferably of triangular shape as shown, and they are so disposed that the offsets 7 give them sufficient space in which to revolve without striking the frame. The hoe blade shanks which project in opposite directions from the flattened enlargement or head 29 are secured in the latter by transverse bolts 31 or similar fastenings.

From the foregoing description taken in connection with the accompanying drawings, it is thought that the construction, operation and advantages of the invention will be readily understood without a more extended explanation.

Having thus described the invention what is claimed is:

1. In a cotton chopper, the combination of a frame, a ground wheel for supporting the same, a longitudinal shaft driven from said wheel and mounted in suitable bearings, the rear end of said shaft having an enlarged flattened end bifurcated longitudinally, hoe blades having shanks arranged in said bifurcated head, and transverse fastenings retaining said shanks in said head.

2. The herein described cotton chopper comprising horizontal side bars having their forward ends bent downwardly to provide vertical hangers, and their rear ends bent downwardly to provide standards for earth-working elements, the intermediate horizontal portions of said side bars being bent to provide oppositely disposed upwardly offset portions, a transverse horizontally disposed shaft arranged in the lower ends of said hangers to unite the forward portions of the side bars, a ground wheel rotatable on said shaft, a draft bail connected to the forward portions of said side bars, a transverse rod uniting the rear portions of said side bars, handles secured at their lower forward ends to said upwardly offset portions of the side bars, braces between said handles and the ends of said transverse rod, a V-shaped hanger uniting the intermediate portions of said side bars and depending therefrom, a spring pressed bearing on said transverse shaft, a longitudinal shaft rotatably mounted in said V-shaped hanger and said slidable bearing, meshing gears on the longitudinal shaft and the ground wheel, and hoes carried by the rear end of the longitudinal shaft and adapted to rotate through the upwardly offset portions of the side bars.

In testimony whereof I hereunto affix my signature in the presence of two witnesses.

ROBERT M. GARNER.

Witnesses:
J. A. WEIR,
GEO. MOLONE.